United States Patent [19]

Okita

[11] 4,250,138
[45] Feb. 10, 1981

[54] PROCESS FOR PRODUCING MICROPOROUS TUBES OF POLYTETRAFLUOROETHYLENE

[75] Inventor: Koichi Okita, Osaka, Japan

[73] Assignee: Sumitomo Electric Industries, Ltd., Osaka, Japan

[21] Appl. No.: 41,586

[22] Filed: May 23, 1979

Related U.S. Application Data

[62] Division of Ser. No. 832,267, Sep. 12, 1977, Pat. No. 4,177,334.

[30] Foreign Application Priority Data

Sep. 13, 1976 [JP] Japan .................................. 51-110536

[51] Int. Cl.$^3$ ....................... B29D 23/01; B29D 27/08
[52] U.S. Cl. .................................. 264/568; 264/127; 264/280; 264/292
[58] Field of Search ..................... 264/127, 288.8, 280, 264/292, 568

[56] References Cited

U.S. PATENT DOCUMENTS

| | | | |
|---|---|---|---|
| 3,085,290 | 4/1963 | Chu | 264/127 |
| 3,295,166 | 1/1967 | Owingo | 264/127 |
| 3,356,108 | 12/1967 | Johnston | 264/127 |
| 3,907,955 | 9/1975 | Viennot | 264/127 |
| 3,953,566 | 4/1976 | Gore | 264/288.8 |

*Primary Examiner*—James B. Lowe
*Attorney, Agent, or Firm*—Sughrue, Rothwell, Mion, Zinn and Macpeak

[57] ABSTRACT

Polytetrafluoroethylene resin tubes having small pore size and high porosity are produced by a process which includes stretching the tubes by drawing using a metal die and a metal plug. By using the die and plug, the stress necessary for stretching is converted to a compressive force in the thickness direction of the tube. This compressive force is an essential factor in producing the microporous structure of the tubes. In addition, when stretching is performed by drawing, a ratio of thickness to inside diameter of the tube of 0.07 or less can be easily achieved.

3 Claims, 2 Drawing Figures

PROCESS FOR PRODUCING MICROPOROUS TUBES OF POLYTETRAFLUOROETHYLENE

This is a Division of application Ser. No. 832,267, filed Sept. 12, 1977 now U.S. Pat. No. 4,177,334.

BACKGROUND OF THE INVENTION

The present invention relates to polytetrafluoroethylene resin tubes having small pore size simultaneously with a high porosity and to a process for producing the same.

Although nonporous tubes or pipes composed of polytetrafluoroethylene resin having various inside diameters and wall thicknesses have been on the market, only quite limited kinds of porous tubes or pipes have been produced. Processes for producing porous polytetrafluoroethylene resin tubes are described in Japanese Patent Publications Nos. 13560/67 and 18991/76. The process for producing porous polytetrafluoroethylene resin tubes as described in these patent publications comprises molding a polytetrafluoroethylene resin by a paste method to form a tube and heating it to 327° C. or more in a stretched state. The tubes produced by such processes have a microstructure comprising nodules linked to one another by fine filaments, and the space surrounded by the filaments and the nodules defines a pore. As a result of various studies about tube molding, the present inventors have found that prior art moldings only having comparatively large pore size as large as $1\mu$ or more are generally obtained by these known processes and they have a defect that porosity remarkably decreases when the pore size is $0.5\mu$ or less.

On the one hand, in spite of being nonporous or porous, there is a definite relation between the inside diameter and the thickness of the polytetrafluoroethylene resin tubes. Namely, if the inside diameter increases, the thickness has a tendency to increase and the ratio of the thickness to the inside diameter is generally larger than 0.1. This depends upon the method of producing the polytetrafluoroethylene resin, such as the paste extruding method, etc. The reasons for this are that the tube before sintering at about 327° C. or more is very brittle and the tube is more easily broken by a slight exterior force if the inside diameter becomes larger. For use in filtration or separation of a mixture such as solids, liquids and gases, etc., it is often preferred to have a small thickness irrespective of the inside diameter of the tube.

SUMMARY OF THE INVENTION

The first object of the present invention is to provide polytetrafluoroethylene resin tubes having small pore size and high porosity.

The second object of the present invention is to provide porous polytetrafluoroethylene resin tubes having small thickness such that a ratio of thickness to inside diameter is 0.07 or less and having a high porosity.

The third object of the present invention to provide a process for expanding the produced microporous tubes.

In the present invention, when the tube is stretched in the lengthwise direction, it is stretched by drawing using a metal die and a metal plug. In this way, the stress necessary to stretch the tube is converted into a compressive force by the plug acting against the die. If necessary, the tube so produced is expanded by reducing the pressure on the outside thereof simultaneously with sintering at 327° C. or more. Thus, a microporous tube is obtained.

DETAILED DESCRIPTION OF THE INVENTION

The moldings of the present invention will be illustrated in detail by comparison with the prior moldings. The characteristics of these moldings are shown by porosity, pore size, thickness, inside diameter and strength, etc. Among these, the porosity and the pore size are the most important characteristics of the porous moldings. The porosity can be calculated by measurement of the specific gravity in air and that in water. Further, although an indication of the pore size differs depending on the method of measurement, the pore size used in this specification means the maximum pore size. The maximum pore size can be calculated by measurement of the bubble point, namely, the pressure at which the first bubble is generated when the molding is wetted by a liquid having a low surface tension such as alcohol, etc. and air pressure is applied to one face of the wetted molding while gradually increasing the air pressure. Refer to, for example, ASTM F316-70. The bubble point is in inverse proportion to the maximum pore size. The larger the bubble point is, the smaller the maximum pore size is.

Moldings obtained by the prior art method which comprises stretching a tube while heating have considerably large pore size, although the pore size somewhat differs by stretching conditions. Namely, in the prior art method, only moldings having a low bubble point are obtained. If it is intended to increase the bubble point by reducing the stretching ratio, the moldings tend to have a low porosity. More specifically, in order to make the porosity 80% or more, the bubble point becomes 0.2 kg/cm$^2$ or less. On the other hand, in order to make the bubble point 0.5 kg/cm$^2$, moldings having a porosity of 60% or less are obtained.

Figure 1:
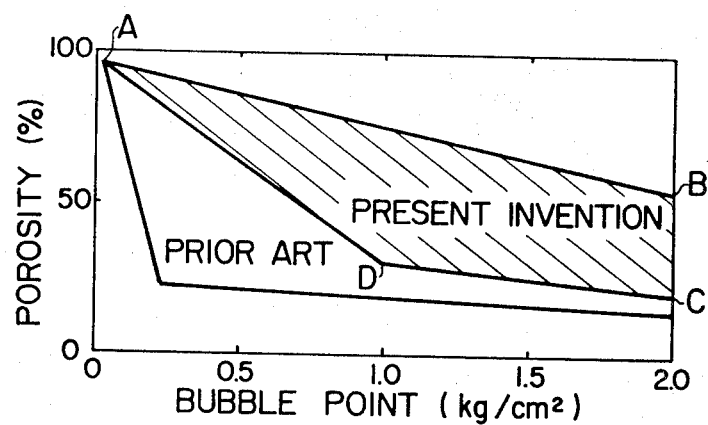
FIG. 1 is a diagram which shows a characteristic range A, B, C and D of the porosity and the bubble point obtained by stretching by drawing and a characteristic range in the prior case of not stretching by drawing.

In contrast, in moldings of the present invention, bubble points of between 0.26 kg/cm$^2$–0.8 kg/cm$^2$ can be suitably obtained while keeping the porosity 80% or more. Further, even if the bubble point is 1.0 kg/cm$^2$, moldings having a porosity up to 75% can be obtained. These relations are shown in detail in FIG. 1. As can be understood from this figure, it is possible to obtain moldings having porosities between 20–60% and bubble points between 1.5 kg/cm$^2$ or 2.0 kg/cm$^2$. This range is shown as an area surrounded by straight lines linking each point A, B, C and D. The porosity and the bubble point at each point are as follows: Point A (96%, 0.02 kg/cm$^2$), Point B (54%, 2.0 kg/cm$^2$), Point C (20%, 2.0 kg/cm$^2$) and Point D (30%, 1.0 kg/cm$^2$).

In the following, a process for producing the moldings of the present invention is illustrated. The first step is to obtain a tubular molding by the paste method. In this step, almost all resins can be used if they are made as a fine powder. As the liquid lubricating agent for mixing, materials which are capable of wetting the surfaces of the resin and capable of being removed by evaporation or extraction at a temperature below the decomposition point of the resin can be used. The polytetrafluoroethylene resin composition containing the liquid lubricating agent is molded by extrusion by means of a ram type extruder to form a tube. Then, the liquid lubricating agent is removed from the tube by evaporation or extraction. These steps are the same as or nearly similar to the steps of molding tubes in the piror art paste method. However, next a stretching step is performed and this is different from the known method. This is a distinguishing feature of the present invention.

In stretching the tube, it is necessary to provide an exterior tensile stress higher than the tensile strength of the tube. Hitherto, fixed points or fulcrums for stress loading are provided in the lengthwise direction of the tube. For example, one end is fixed and the other end is drawn. A similar effect can be accomplished by stretching by means of rolls equipped with grooves and having a different revolving ratio. In the present invention, fixed points or fulcrums for stress loading are provided in the lengthwise direction and a reduction die and plug is provided through the thickness of the tube so as to disperse a part of the stress in the diameter direction or the thickness direction of the tube. Thus, the reduction die and plug functions as a fixed point or a fulcrum for the stress load in the thickness direction of the tube.

Figure 2:
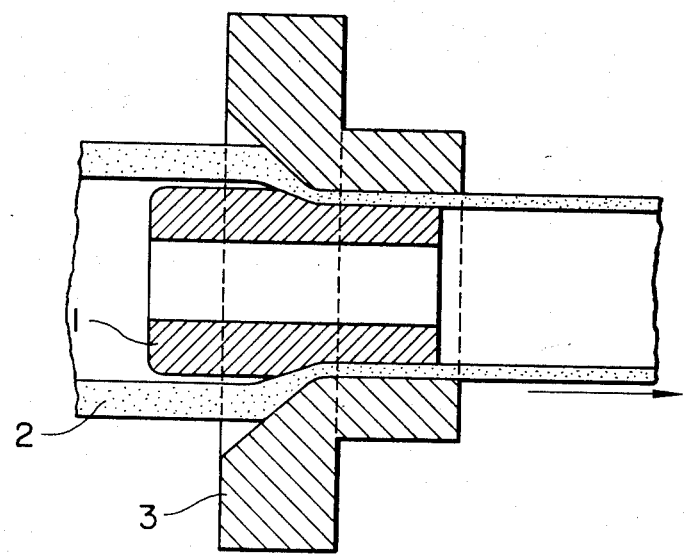
FIG. 2 is a simplified cross-sectional view which shows the relation of the plug 1, the tube 2 and the die 3 suitable for stretching by drawing.

FIG. 2 illustrates the stretching process according to the invention. The plug 1 functions as a mandrel and is composed of two columnar parts, one having a size smaller than the initial inside diameter of the tube 2 and a tappered part. On the other hand, the die 3 is composed of an orifice part having a size smaller than the initial outside diameter of the tube 2 and a tapered part. It is preferred that the angle of the tapered part in the die 3 be larger than that in the plug 1.

When the tube 2 is stretched in the direction of the arrow a part of the stress is converted into a compressive force in the thickness direction in the tapered parts of the plug 1 and the die 3, and consequently the thickness of the tube 2 becomes small. Of course, in this case, the plug 1, the tube 2 and the die 3 are all heated to a temperature lower than the melting point of the polytetrafluoroethylene resin. Since the residual liquid lubricating agent often evaporates, it is preferred to provide openings for dispersing the evaporated gas in the center of the plug 1. The compressive force depends upon the angle of the tapered parts of the plug 1 and the die 3, the inside diameter of the orifice in the die 3, the outside diameter and weight of the plug 1, the thickness of the tube 2 and the temperature, speed or stretching ratio for stretching by drawing. In order to obtain small pore size and a high porosity, it is preferred that conventional stretching which does not use the die and plug be first carried out and then stretching by drawing is carried out using the die and plug.

In carrying out stretching without the use the die and plug, an increase of the porosity and an increase of pore size first occur. Then, the pore size decreases; that is, the bubble point increases by carrying out stretching by drawing, while the porosity somewhat decreases. In cases of carrying out stretching only by drawing, the porosity does not sufficiently increase even though the pore size decreases or, on the contrary, the pore size sometimes does not decrease when the porosity is large. Further, if the stretching ratio is too large, the pore size increases again as a function of the compressive force. Therefore, it is preferred to generate the compressive force at a comparatively low stretching ratio from the viewpoint of producing a tube having a high porosity and small pore size.

The molding stretched by drawing is then sintered at a temperature of about 327° C. or more to fix its structure obtained by stretching. In this case, the thickness of the tube becomes thin and the ratio of thickness to inside diameter of the tube is nearly the same as the case of an extrusion tube prepared using the paste method. However, if the tube is held so that it is not contracted in the lengthwise direction of the tube and is expanded in the diameter direction by reducing the pressure of the outside of the tube when sintering at a temperature of about 327° C. or more is carried out, the thickness of the tube becomes even thinner and the inside diameter thereof becomes larger. Consequently, it is possible to obtain a ratio of thickness to inside diameter of 0.07 or less and sometimes 0.03. Such porous tubes having a ratio of 0.03 generally can not be obtained by the paste extrusion method, and long moldings can not be obtained even if short moldings can be produced.

It has been found that the degree of expansion in the diameter direction can be quite freely selected by varying the reduction in outside pressure. However, if the degree of expansion is large, though the porosity increases, the bubble point tends to decrease as illustrated by the characteristic in the upper left area of FIG. 1. Polytetrafluoroethylene resin tubes having such small pore size simultaneously with a high porosity did not exist hitherto, although it has been known that such tubes would provide meaningful materials for artificial tubular internal organs or industrial filtration.

In the following, the present invention will be illustrated with reference to examples. However the scope of the present invention is not limited to these examples.

EXAMPLE 1

3 kg of Polyflon F-104 (tradename of polytetrafluroethylene fine powder produced by Daikin Kogyo Co.) was mixed with 0.75 kg of Deo-Base (tradename of a light petroleum distilate produced by Witco Chemical Co.) and the mixture was extruded at a section reduction ratio of 580 to form a tube having a 5.5 mm outside diameter and a 4.0 mm inside diameter. After removing the Deo-Base by extraction with trichloroethylene, the tube was stretched fourfold at 300° C. in the lengthwise direction at a 20 cm/min tube supplying rate. The tube was then stretched twofold or threefold by drawing using a die, having a 4.2 mm orifice diameter and a 30° taper angle, and a plug, having columnar parts with outside diameters of a 4.0 mm and 3.0 mm and a 20° taper angle, at a 300° C. tube temperature in the lengthwise direction at a 20 cm/min tube supplying rate.

The tube stretched by drawing was sintered by passing the tube through an electric furnace at 510° C. at 60 cm/min. The results are shown in Table 1. For comparison, the characteristics of a tube produced under the same conditions without using the die and the orifice are also shown in Table 1.

TABLE 1

| Experiment No. | Second stretching ratio | Die and plug | Porosity (%) | Bubble point (kg/cm$^2$) | Inside diameter (mm) | Thickness (mm) |
|---|---|---|---|---|---|---|
| 1 | 2 times | Present | 40.4 | 1.3 | 3.2 | 0.195 |
| 2 | 3 | Present | 81.6 | 0.31 | 3.3 | 0.346 |
| 3 | 2 | Absent | 76.0 | 0.20 | 3.4 | 0.48 |

TABLE 1-continued

| Experiment No. | Second stretching ratio | Die and plug | Porosity (%) | Bubble point (kg/cm$^2$) | Inside diameter (mm) | Thickness (mm) |
|---|---|---|---|---|---|---|
| 4 | 3 | Absent | 85.3 | 0.11 | 3.4 | 0.44 |

In the tubes which were not stretched by drawing, the ratio of thickness to inside diameter is more than 0.1. On the other hand, it is clear that the bubble point is high in cases of tubes which were produced by stretching using the die and the plug.

EXAMPLE 2

The tube stretched by drawing in Example 1 was introduced under reduced pressure in an electric furnace and heated to 327° C. or more while the tube was expanded by reducing the pressure on the outside of the tube. The characteristics obtained are shown in Table 2.

TABLE 2

| Experiment No. | Second stretching ratio | Porosity (%) | Bubble point (kg/cm$^2$) | Inside diameter (mm) | Thickness (mm) |
|---|---|---|---|---|---|
| 5 | 2 times | 56.4 | 0.76 | 5.8 | 0.12 |
| 6 | 3 | 83.7 | 0.27 | 5.6 | 0.28 |

The bubble point decreases as compared with the cases in Example 1, but the porosity tends to increase and the ratio of thickness to inside diameter becomes small, which is 0.02 and 0.05.

EXAMPLE 3

The same experiment was carried out as in Example 1 except that the columnar parts of the plug had outside diameters of 4.0 mm and 3.5 mm and the taper angle was 17°, 21° or 36°. The first stretching was carried out by stretching threefold and the second stretching was carried out by stretching twofold or threefold.

The sintering was carried out without using a reduced pressure.

TABLE 3

| Experiment No. | Taper angle | Second stretching ratio | Porosity (%) | Bubble point (kg/cm$^2$) | Inside diameter (mm) | Thickness (mm) |
|---|---|---|---|---|---|---|
| 7 | 17° | 2 times | 61.2 | 1.12 | 3.4 | 0.27 |
| 8 | 17 | 3 | 73.7 | 0.43 | 3.4 | 0.18 |
| 9 | 21 | 2 | 60.3 | 1.55 | 3.5 | 0.21 |
| 10 | 21 | 3 | 70.5 | 0.46 | 3.4 | 0.18 |
| 11 | 36 | 2 | 57.4 | 1.76 | 3.6 | 0.21 |
| 12 | 36 | 3 | 68.7 | 0.54 | 3.4 | 0.18 |

When the taper angle increases, the porosity slightly decreases and consequently the bubble point increases and the thickness decreases. This is supposed to be due to a change of compressive force in the thickness direction.

EXAMPLE 4

A tube having an outside diameter of 8.0 mm and an inside diameter of 6.0 mm was produced in the same manner as in Example 1. After the tube was stretched threefold, it was stretched twofold by drawing using a die having a 5.1 mm orifice diameter and a 30° taper angle and a plug having columnar parts with outside diameters of 6.0 mm and 5.1 mm and a 25° taper angle at a 290° C. tube temperature at a 25 cm/min tube supplying rate. The tube sintered at 360° C. had a 68% porosity, a 0.62 kg/cm$^2$ bubble point, a 4.8 mm inside diameter and a 0.23 mm thickness. The tube which was expanded by reducing the outside pressure while sintering at 360° C. had a 85% porosity, a 0.39 kg/cm$^2$ bubble point, a 9.5 mm inside diameter and a 0.09 mm thickness.

What is claimed is:

1. A process for producing microporous tubes which comprises molding a polytetrafluoroethylene resin containing a liquid lubricating agent by a paste method to form a tube, removing the liquid lubricating agent, stretching by drawing the tube in a lengthwise direction using a die and a plug, and sintering at a temperature of about 327° C. or more whereby as a result of said stretching and said drawing, a microporous tube is produced having a porosity and a bubble point in a range between the point A, B, C and D defined in the following table;

|   | porosity | bubble point |
|---|---|---|
| A | 96% | 0.02 kg/cm$^2$ |
| B | 54% | 2.0 kg/cm$^2$ |
| C | 20% | 2.0 kg/cm$^2$ |
| D | 30% | 1.0 kg/cm$^2$ | and having a ratio of wall thickness to inside diameter of about 0.1 or less.

2. A process for producing microporous tubes as set forth in claim 1, wherein the stretching in the lengthwise direction is carried out two or more times and the final stretching is carried out by drawing using the die and the plug.

3. A process for producing microporous tubes as set forth in claim 1 which comprises sintering the tube at about 327° C. or more simultaneously with expanding the tube by reducing the pressure on the outside of the tube after carrying out stretching by drawing.

* * * * *